US012688137B2

(12) United States Patent　　(10) Patent No.:　US 12,688,137 B2
Tada　　(45) Date of Patent:　　Jul. 21, 2026

(54) DISPLAY APPARATUS AND PERIPHERAL DEVICE SIGNAL SWITCHING METHOD

(71) Applicant: SHARP KABUSHIKI KAISHA, Sakai City (JP)

(72) Inventor: Seiji Tada, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 9 days.

(21) Appl. No.: 18/910,260

(22) Filed: Oct. 9, 2024

(65) Prior Publication Data

US 2025/0123982 A1　　Apr. 17, 2025

(30) Foreign Application Priority Data

Oct. 12, 2023　(JP) ................................. 2023-176513

(51) Int. Cl.
　　*G06F 13/40*　　　(2006.01)
　　*G09G 5/00*　　　(2006.01)
(52) U.S. Cl.
　　CPC ......... *G06F 13/4022* (2013.01); *G09G 5/006* (2013.01); *G06F 2213/4004* (2013.01); *G09G 2370/045* (2013.01)
(58) Field of Classification Search
　　CPC ........ G06F 13/4022; G06F 2213/4004; G06G 5/006; G09G 2370/045
　　See application file for complete search history.

(56) References Cited

U.S. PATENT DOCUMENTS

| | | | |
|---|---|---|---|
| 9,907,108 B2 * | 2/2018 | Kunieda | ................ H04W 76/19 |
| 2004/0004896 A1 * | 1/2004 | Zitlaw | .................... G11C 5/147 |
| | | | 365/227 |
| 2014/0307174 A1 * | 10/2014 | Zhu | .................... H04N 21/4312 |
| | | | 348/739 |
| 2015/0154361 A1 * | 6/2015 | Barsoum | ................ G16H 10/60 |
| | | | 705/3 |
| 2015/0358553 A1 * | 12/2015 | Cox | ........................ H04N 5/268 |
| | | | 348/705 |
| 2017/0045957 A1 * | 2/2017 | Holmgren | .............. H04N 23/90 |

(Continued)

FOREIGN PATENT DOCUMENTS

JP　　　　2000-242377 A　　　9/2000

*Primary Examiner* — Henry Tsai
*Assistant Examiner* — Aurangzeb Hassan
(74) *Attorney, Agent, or Firm* — ScienBiziP, P.C.

(57)　　　　ABSTRACT
A display apparatus comprises a peripheral device signal switcher that selects and switches a data communication destination of a peripheral device connector between an internal computer and an external computer device in conjunction with switching of an input source of a video signal by a video signal switcher in such a way that a data communication destination of the peripheral device connector becomes identical to the input source of the video signal, in a case where switching of the input source of the video signal by the video signal switcher is performed, wherein the peripheral device signal switcher suspends switching of the data communication destination of the peripheral device connector without switching the data communication destination of the peripheral device connector in conjunction with switching by the peripheral device signal switcher, in a case where a discriminator discriminates that a peripheral device connection port is in data communication.

7 Claims, 2 Drawing Sheets

(56) References Cited

U.S. PATENT DOCUMENTS

| 2017/0212718 A1* | 7/2017 | Nelson | G06F 3/04817 |
| 2022/0188262 A1* | 6/2022 | Heckroth | G06F 13/4282 |
| 2022/0286736 A1* | 9/2022 | Guruva Reddiar | H04N 19/172 |

* cited by examiner

DISPLAY APPARATUS AND PERIPHERAL DEVICE SIGNAL SWITCHING METHOD

CROSS-REFERENCE TO RELATED APPLICATION

The present application claims priority from Japanese Application JP2023-176513, the content of which is hereby incorporated by reference into this application.

BACKGROUND

1. Field

The present disclosure relates to a display apparatus and a peripheral device signal switching method.

2. Description of the Related Art

Conventional art describes a display apparatus including: a video signal switching device that switches a video signal received from two personal computers, and sends the video signal to a displayer; a USB signal switching device that switches a USB signal received from the two personal computers, and sends the USB signal to a USB hub; and a switching device controller that enables the video signal switching device and the USB signal switching device to be controlled by a USB keyboard. In the display apparatus, a video signal and a USB signal from the same personal computer are simultaneously switched by an operation from the USB keyboard, and sent to the displayer within a display and the USB hub.

SUMMARY

Switching of connection of a peripheral device connection port to which a peripheral device is connected between an internal computer of a display apparatus and an externally connected computer device is normally performed simultaneously in conjunction with switching of an input of a video signal. However, from a viewpoint of data protection within a storage device, persistence of a meeting application using a camera and a microphone, and the like, there is a case where switching of a peripheral device connection port should not be simultaneously performed in conjunction with switching of an input of a video signal.

An object of the present disclosure is to provide a display apparatus and a peripheral device signal switching method that suspend switching of a peripheral device signal during usage of a peripheral device connection port, even when a video signal is switched.

A display apparatus of the present disclosure includes an internal computer, a displayer, a peripheral device connector, an external computer device connector, a video signal switcher, a discriminator, and a peripheral device signal switcher. The displayer displays a video, based on an input video signal. The peripheral device connector includes a peripheral device connection port to which a peripheral device is connected. The external computer device connector is connected to an external computer device. The video signal switcher selects and switches an input source of the video signal to be input to the displayer between the internal computer and the external computer device. The discriminator discriminates whether the peripheral device connection port is in data communication. The peripheral device signal switcher selects and switches a data communication destination of the peripheral device connector between the internal computer and the external computer device in conjunction with switching of an input source of the video signal by the video signal switcher in such a way that a data communication destination of the peripheral device connector becomes identical to an input source of the video signal, in a case where switching of an input source of the video signal by the video signal switcher is performed. The peripheral device signal switcher suspends switching of a data communication destination of the peripheral device connector without switching a data communication destination of the peripheral device connector in conjunction with switching by the peripheral device signal switcher, in a case where the discriminator discriminates that the peripheral device connection port is in data communication.

A peripheral device signal switching method of the present disclosure is used in a display apparatus provided with an internal computer, a displayer that displays a video, based on an input video signal, a peripheral device connector including a peripheral device connection port to which a peripheral device is connected, and an external computer device connector to which an external computer device is connected. The peripheral device signal switching method includes a video signal switching step, a discriminating step, and a peripheral device signal switching step. In the video signal switching step, a video signal switcher selects and switches an input source of the video signal to be input to the displayer between the internal computer and the external computer device. In the discriminating step, a discriminator discriminates whether the peripheral device connection port is in data communication. In the peripheral device signal switching step, in a case where switching of an input source of the video signal is performed, a peripheral device signal switcher selects and switches a data communication destination of the peripheral device connector between the internal computer and the external computer device in conjunction with switching of an input source of the video signal in such a way that a data communication destination of the peripheral device connector becomes identical to an input source of the video signal. In the peripheral device signal switching step, in a case where it is discriminated that the peripheral device connection port is in data communication in the discriminating step, the peripheral device signal switcher suspends switching of a data communication destination of the peripheral device connector without switching a data communication destination of the peripheral device connector in conjunction with switching in the video signal switching step.

According to the present disclosure, since switching of a peripheral device signal is suspended during usage of a peripheral device connection port, even when a video signal is switched, occurrence of a failure due to switching of a peripheral device signal being simultaneously performed in conjunction with switching of the video signal is prevented.

DESCRIPTION OF EMBODIMENTS

Figure 1:
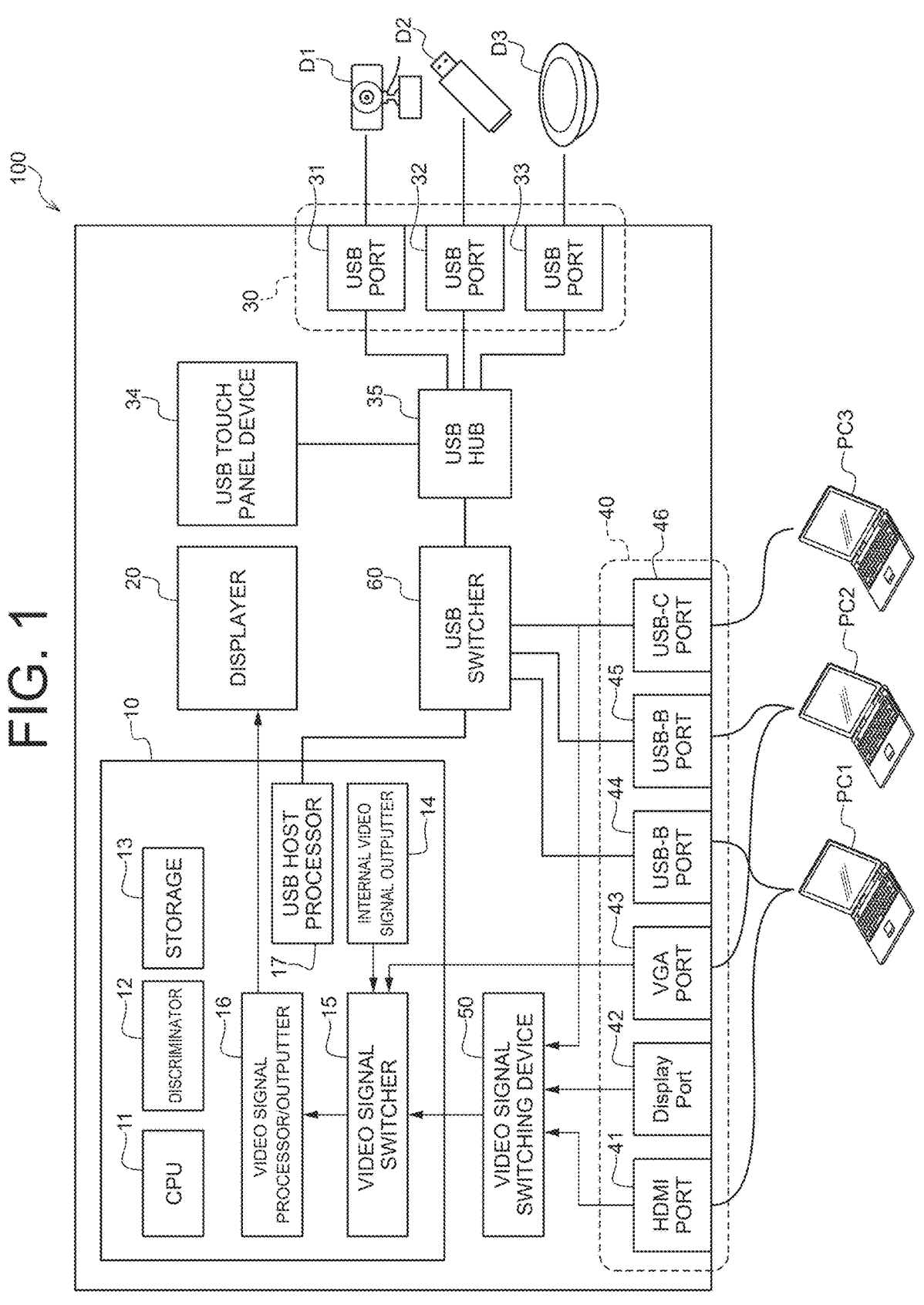
FIG. 1 is a block diagram illustrating a configuration of a display apparatus 100 according to an embodiment of the present disclosure.

An embodiment of the present disclosure is described with reference to the drawings. Note that, in the drawings, the same or an equivalent portion is denoted by the same reference sign, and description thereof is not repeated.

(1) Configuration of Display Apparatus 100

First, with reference to FIG. 1, description is made regarding a display apparatus 100 that switches connection of a peripheral device connection port between an internal computer and one of externally connected computer devices. FIG. 1 is a block diagram illustrating a configuration of the display apparatus 100 according to an embodiment of the present disclosure.

As illustrated in FIG. 1, the display apparatus 100 includes an internal computer 10, a displayer 20, a peripheral device connector 30, an external computer device connector 40, a video signal switching device 50, and a USB switcher 60. The internal computer 10 includes a central processing unit (CPU) 11, a discriminator 12, a storage 13, an internal video signal outputter 14, a video signal switcher 15, a video signal processor/outputter 16, and a USB host processor 17. Note that, USB is an abbreviation of universal serial bus. USB is one of serial bus standards for connecting a peripheral device to an information device such as a computer, and is widely used at present. Although USB is a registered trademark, a note to that effect is omitted in the following paragraphs.

The internal computer 10 is operated as a computer device inside the display apparatus 100. That is, the display apparatus 100 is not a display device or a monitor device that simply displays a video signal to be input from the outside. The display apparatus 100 is operated, for example, as an interactive whiteboard (IWB). In this case, in the display apparatus 100, an operation by a touch panel is enabled, characters, symbols, and the like can be freely written on a displayed image with a touch pen, and a Web meeting can be held, but the present embodiment is not limited thereto.

The CPU 11 controls each unit of the internal computer 10. For example, the CPU 11 may be a processor, or a micro processing unit (MPU), but is not limited thereto.

The discriminator 12 discriminates whether a peripheral device connection port to which a peripheral device is connected is in data communication. The peripheral device refers to various devices to be used by being connected to a computer. For example, the peripheral device illustrated in FIG. 1 includes a Web camera D1, a USB memory D2, and a smart speaker D3, but is not limited thereto. The peripheral device connection port is an insertion port into which a connection cable or a plug of a small peripheral device itself is inserted for connection. Specifically, the peripheral device connection port includes a USB port in conformity with USB, but is not limited thereto. In the display apparatus 100, the discriminator 12 discriminates whether USB ports 31 to 33 are in data communication. However, the number of USB ports is not limited to three.

The storage 13 stores or accommodates information and data necessary for the internal computer 10, a program and the like to be executed by the CPU 11. The storage 13 includes a memory, specifically, a volatile memory and a non-volatile memory. The volatile memory includes, for example, a dynamic random access memory (DRAM), and a static random access memory (SRAM), but is not limited thereto. The non-volatile memory includes, for example, a read-only member (ROM), a flash memory, a solid state drive (SSD), and a hard disk, but is not limited thereto.

The internal video signal outputter 14 outputs a video signal of the internal computer 10 to the video signal switcher 15.

The video signal switcher 15 selects and switches an input source of a video signal to be input to the displayer 20 between the internal computer 10 and one of external computer devices. In the display apparatus 100 illustrated in FIG. 1, three personal computers PC1 to PC3 are exemplified as external computer devices. That is, the video signal switcher 15 selects and switches an input source of a video signal to be input to the displayer 20 between the internal computer 10 and one of the personal computers PC1 to PC3. However, in the display apparatus 100, switching of a video signal as described above is achieved not only by the video signal switcher 15 but also by combination of the video signal switcher 15 and the video signal switching device 50 to be described later.

The video signal switcher 15 receives a digital video signal from the internal video signal outputter 14, a digital video signal from the video signal switching device 50, and an analog video signal from a VGA port 43 to be described later. The video signal switcher 15 selects one of these three video signals, and outputs the selected signal to the video signal processor/outputter 16. However, a circuit configuration as described above is merely an example, and may vary depending on the design of a chip, a substrate, or the like. Note that, switching of a video signal is manually performed by an operation member (not illustrated) provided in the display apparatus 100 or a remote controller. A video signal may be automatically switched when an external computer device is connected and the video signal is input.

The video signal processor/outputter 16 processes a video signal selected by the video signal switcher 15, and outputs the video signal to the displayer 20.

The USB host processor 17 includes a host controller serving as a processing device, and a root hub serving as a connector of a first USB bus.

The displayer 20 displays a video, based on an input video signal. The displayer 20 includes, for example, a liquid crystal display, and an organic electro-luminescence (EL) display, but is not limited thereto.

The peripheral device connector 30 includes a peripheral device connection port to which a peripheral device is connected. Specifically, the peripheral device connector 30 includes the three USB ports 31 to 33. The display apparatus 100 further includes a USB touch panel device 34 and a USB hub 35. The USB ports 31 to 33 are connected to the USB switcher 60 via the USB hub 35. The USB hub 35 is connected to the USB touch panel device 34 that allows a touch operation on the displayer 20. That is, the USB touch panel device 34 in the display apparatus 100 corresponds to one of peripheral devices being connected to USB.

The external computer device connector 40 is connected to an external computer device. The external computer device connector 40 includes, as dedicated video signal input ports, a HDMI (registered trademark, the same is also applied hereinafter) port 41, a Display Port (registered trademark, the same is also applied hereinafter) 42, and the VGA (registered trademark, the same is also applied hereinafter) 43. Note that, HDMI is an abbreviation of high-definition multimedia interface. Display Port (may also be abbreviated as DP) is standards of a video output interface designed for a digital display apparatus. An analog RGB component video signal is input to the VGA port.

Further, the external computer device connector 40 includes, as USB signal ports, a USB-B port 44, a USB-B port 45, and a USB-C port 46. Note that, the USB-B port 44 and the USB-B port 45 are ports in conformity with USB Type-B (registered trademark, the same is also applied hereinafter) standards. The USB-C port 46 is a port in conformity with USB Type-C (registered trademark, the same is also applied hereinafter) standards. According to the USB-C port 46, not only a USB signal but also a video signal can be transmitted by one cable.

The personal computer PC1 is connected to the HDMI port 41 by a video signal cable, and is connected to the USB-B port 44 by a USB cable. The personal computer PC2 is connected to the VGA port 43 by a video signal cable, and is connected to the USB-B port 45 by a USB cable. The personal computer PC3 is connected to the USB-C port 46 by one USB Type-C cable that transmits a USB signal and a video signal.

A digital video signal from the HDMI port 41, a digital video signal from the Display Port 42, and a digital video signal from the USB-C port 46 are input to the video signal switching device 50. The video signal switching device 50 selects one of these digital video signals, and outputs the selected signal to the video signal switcher 15.

In a case where switching of an input source of a video signal by the video signal switcher 15 is performed, the USB switcher 60 selects and switches a data communication destination of the peripheral device connector 30 between the internal computer 10, and one of the personal computers PC1 to PC3 in conjunction with switching of an input source of the video signal by the video signal switcher 15 in such a way that a data communication destination of the peripheral device connector 30 becomes identical to an input source of the video signal. Note that, the USB switcher 60 is an example of a "peripheral device signal switcher" of the present disclosure.

In a case where the discriminator 12 discriminates that the USB ports 31 to 33 are in data communication, the USB switcher 60 suspends switching of a data communication destination of the peripheral device connector 30 without switching a data communication destination of the peripheral device connector 30 in conjunction with switching by the USB switcher 60.

Therefore, as far as at least one of the USB ports 31 to 33 of the display apparatus 100 is in use, switching of a peripheral device signal is suspended, even when the video signal is switched. Consequently, occurrence of a failure due to switching of a peripheral device signal being performed simultaneously in conjunction with switching of the video signal is prevented.

In a case where switching of a data communication destination of the peripheral device connector 30 by the USB switcher 60 is suspended, the USB switcher 60 performs the suspended switching of a data communication destination of the peripheral device connector 30 by the USB switcher 60 at a time when it is discriminated that the USB ports 31 to 33 are no longer in data communication. Therefore, switching of a USB signal is promptly performed at a time when suspension of switching of a USB signal becomes unnecessary. Consequently, usage of the USB ports 31 to 33 by the display apparatus 100 itself or an external computer device associated with a display content of the displayer 20 at that time is enabled.

Further, in a case where switching of a data communication destination of the peripheral device connector 30 by the USB switcher 60 is suspended, the USB switcher 60 may cause the displayer 20 to display indicating that switching is suspended. Therefore, while switching by the USB switcher 60 is suspended, display indicating to that effect is performed on the displayer 20. Consequently, the user can easily recognize that switching of a USB signal is suspended.

As described above, one of the peripheral devices is a touch input device including a touch sensor, that is, the USB touch panel device 34. Therefore, a connection destination of the touch sensor can be switched by the USB switcher 60. Consequently, the touch sensor can be used not only on the display apparatus 100 itself but also on an external computer device.

(2) Operation Example of Display Apparatus 100

For example, in a situation where data access to the peripheral devices D1 to D3 is performed from the internal computer 10 or one of the personal computers PC1 to PC3 via the USB ports 31 to 33, the USB switcher 60 discriminates that the USB ports 31 to 33 are in data communication.

Therefore, during data access to the peripheral devices D1 to D3 connected to the USB ports 31 to 33, even when a video signal is switched by the video signal switcher 15, switching of a USB signal by the USB switcher 60 is suspended. Consequently, occurrence of a failure of data within the peripheral devices D1 to D3 due to switching of a USB signal is prevented.

Further, in a situation where rewriting of date stored in an internal storage medium of the peripheral devices D1 to D3 is performed from the internal computer 10 or one of the personal computers PC1 to PC3 via the USB ports 31 to 33, the USB switcher 60 may discriminate that the USB ports 31 to 33 are in data communication. Specifically, rewriting of a file within the USB memory D2 connected to the USB port 32 is exemplified, but the present embodiment is not limited to a situation as described above.

Therefore, during rewriting of data stored in an internal storage medium of the peripheral devices D1 to D3 connected to the USB ports 31 to 33, switching of a USB signal by the USB switcher 60 is suspended, even when a video signal is switched by the video signal switcher 15. Consequently, occurrence of a failure of data stored in an internal storage medium of the peripheral devices D1 to D3 due to switching of a USB signal is prevented.

Further, in a situation where video or audio communication is performed between the internal computer 10 or one of the personal computers PC1 to PC3, and the peripheral devices D1 to D3 via the USB ports 31 to 33, the USB switcher 60 may discriminate that the USB ports 31 to 33 are in data communication. Specifically, a video meeting using the Web camera D1 connected to the USB port 31 is exemplified, but the present embodiment is not limited to a situation as described above.

Therefore, during video or audio communication via the peripheral devices D1 to D3 connected to the USB ports 31 to 33, switching of a USB signal by the USB switcher 60 is suspended, even when a video signal is switched by the video signal switcher 15. Consequently, an unexpected circumstance such as interruption of a video meeting due to switching of a USB signal is avoided.

(3) Peripheral Device Signal Switching Method in Display Apparatus 100

Figure 2:
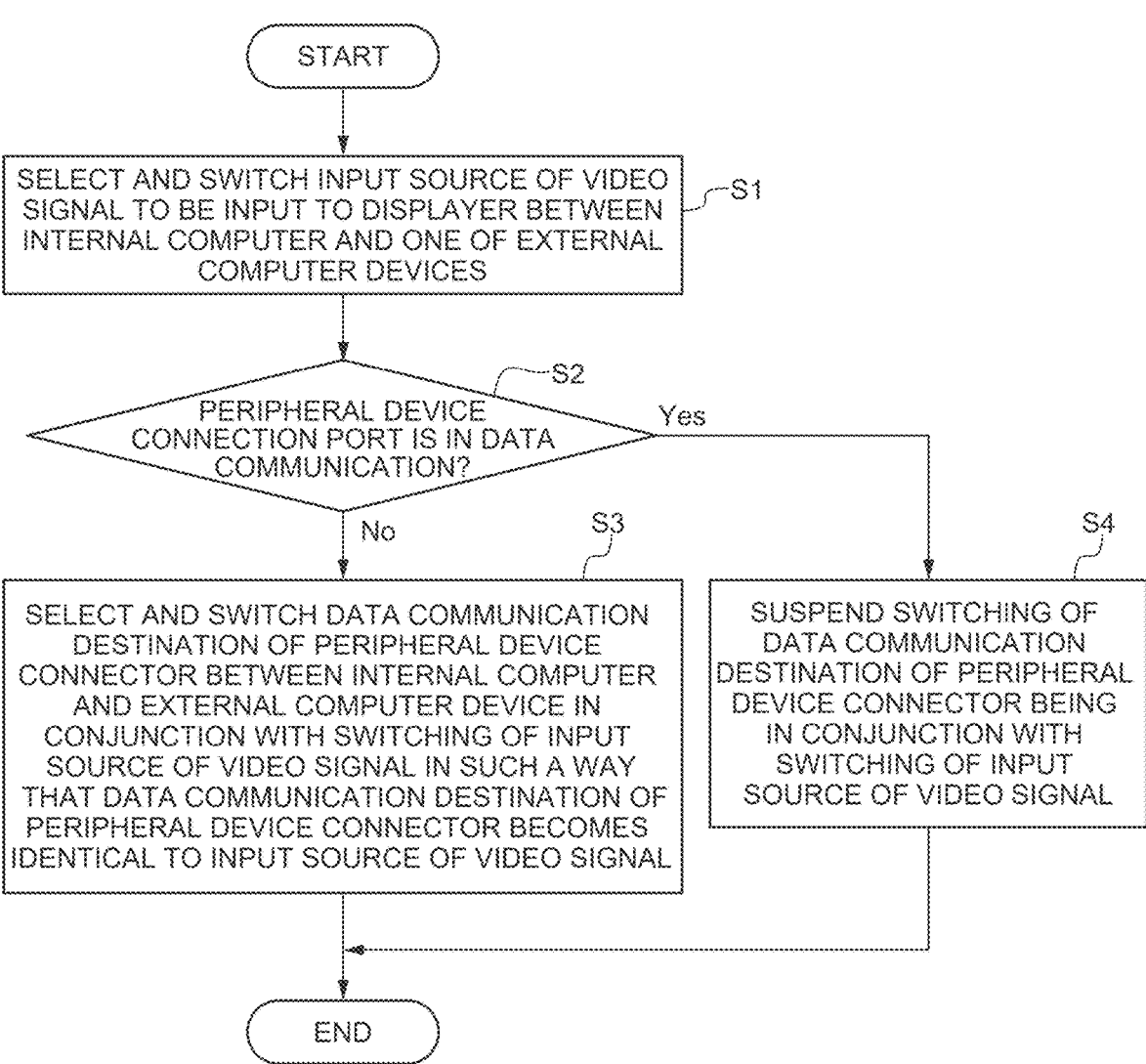
FIG. 2 is a flowchart illustrating a peripheral device signal switching method in the display apparatus 100.

Next, a peripheral device signal switching method in the display apparatus 100 is described with reference to FIG. 2. FIG. 2 is a flowchart illustrating a peripheral device signal switching method in the display apparatus 100. Note that, the display apparatus 100 includes the internal computer 10, the displayer 20 that displays a video, based on an input video signal, the peripheral device connector 30 including the USB ports 31 to 33 to which a peripheral device is connected, and the external computer device connector 40 to which an external computer device is connected.

As illustrated in FIG. 2 in step S1, the video signal switcher 15 selects and switches an input source of a video signal to be input to the displayer 20 between the internal computer 10 and one of the external computer devices.

In step S2, the discriminator 12 discriminates whether at least one of the USB ports 31 to 33 is in data communication, and in a case where the discrimination result is No, the processing proceeds to step S3, and in a case where the discrimination result is Yes, the processing proceeds to step S4.

Step S3 is a case where switching of an input source of a video signal is performed in step S1, and a case where it is not discriminated that at least one of the USB ports 31 to 33 is in data communication in step S2. Specifically, this means that none of the USB ports 31 to 33 is in data communication. In step S3, the USB switcher 60 selects and switches a data communication destination of the peripheral device connector 30 between the internal computer 10 and one of the external computer devices in conjunction with switching of an input source of a video signal in such a way that a data communication destination of the peripheral device connector 30 becomes identical to an input source of the video signal.

On the other hand, step S4 is a case where switching of an input source of a video signal is performed in step S1, and a case where it is discriminated that at least one of the USB ports 31 to 33 is in data communication in step S2. In step S4, the USB switcher 60 suspends switching of a data communication destination of the peripheral device connector 30 without switching a data communication destination of the peripheral device connector 30 in conjunction with switching in step S1.

Therefore, as far as at least one of the USB ports 31 to 33 is in use, switching of a peripheral device signal is suspended, even when a video signal is switched. Consequently, occurrence of a failure due to switching of a peripheral device signal being performed simultaneously in conjunction with switching of a video signal is prevented.

The present disclosure can be implemented in other various ways without departing from the gist or a primary feature thereof. Therefore, the above-described embodiment is merely an example in all aspects, and should not be construed in a restrictive way. The scope of the present disclosure is defined by the scope of the claims, and is not constrained by the text of the specification. Further, all modifications and variations that come within the equivalent scope of the claims are within the scope of the present disclosure.

The present disclosure is applicable to a display apparatus, a peripheral device signal switching method, and the like.

What is claimed is:

1. A display apparatus comprising:
an internal computer;
a display that displays a video based on a video signal being input;
a peripheral device connector including a peripheral device connection port to which a peripheral device is connected;
an external computer device connector to which an external computer device is connected;
a video signal switcher that selects and switches an input source of the video signal to be input to the display between the internal computer and the external computer device;
a determiner that determines whether the peripheral device port is in data communication; and
a peripheral device signal switcher that selects and switches a data communication destination of the peripheral device connector between the internal computer and the external computer device in conjunction with switching of the input source of the video signal by the video signal switcher in such a manner that the data communication destination of the peripheral device connector becomes identical to the input source of the video signal in a case that the switching of the input source of the video signal is performed by the video signal switcher, wherein:
the peripheral device signal switcher suspends switching of the data communication destination of the peripheral device connector without switching the data communication destination of the peripheral device connector in conjunction with switching, by the peripheral device signal switcher, in a case that the determiner determines that the peripheral device connection port is in the data communication, and
in a case that the switching of the data communication destination of the peripheral device connector by the peripheral device signal switcher is suspended, the peripheral device signal switcher performs the suspended switching of the data communication destination of the peripheral device connector at a time when the determiner determines that the peripheral device connection port is no longer in the data communication.

2. The display apparatus according to claim 1, wherein in a case that the switching of the data communication destination of the peripheral device connector by the peripheral device signal switcher is suspended, the peripheral device signal switcher causes the display to display an indication that the switching of the data communication destination of the peripheral device connector is suspended.

3. The display apparatus according to claim 1, wherein in a data stored in the peripheral device is accessed by the internal computer or the external computer device via the peripheral device connection port, the determiner determines that the peripheral device connection port is in the data communication.

4. The display apparatus according to claim 1, wherein in a case that data stored in an internal storage medium of the peripheral device is rewritten by the internal computer or the external computer device via the peripheral device connection port, the determiner determines that the peripheral device connection port is in the data communication.

5. The display apparatus according to claim 1, wherein in a case that video or audio communication is performed between the internal computer, or the external computer device, and the peripheral device via the peripheral device connection port, the determiner determines that the peripheral device connection port is in the data communication.

6. The display apparatus according to claim 1, wherein the peripheral device is a touch input device including a touch sensor.

7. A peripheral device signal switching method for use in a display apparatus that is provided with;
an internal computer,
a display that displays a video based on a video signal being input,
a peripheral device connector including a peripheral device connection port to which a peripheral device is connected, and
an external computer device connector to which an external computer device is connected, the peripheral device signal switching method comprising:

selecting and switching, by a video signal switcher, an input source of the video signal to be input to the display between the internal computer and the external computer device;

determining, by a determiner, whether the peripheral device connection port is in data communication; and selecting and switching, by a peripheral device signal switcher, a data communication destination of the peripheral device connector between the internal computer and the external computer device in conjunction with switching of the input source of the video signal in such a manner that the data communication destination of the peripheral device connector becomes identical to the input source of the video signal in a case that the switching of the input source of the video signal is performed, wherein selecting and switching the data communication destination of the peripheral device connector comprises:

in a case that the peripheral device connection port is determined to be in the data communication suspending switching of the data communication destination of the peripheral device connector without switching the data communication destination of the peripheral device connector in conjunction with switching in the video signal switching, and in a case that the switching of the data communication destination of the peripheral device connector by the peripheral device signal switcher is suspended, performing the suspended switching of the data communication destination of the peripheral device connector by the peripheral device signal switcher at a time when the peripheral device connection port is determined to be no longer in the data communication.

* * * * *